United States Patent [19]

Screen et al.

[11] 3,894,310

[45] July 15, 1975

[54] TWIN-WHEELED CASTOR

[76] Inventors: Stafford Thomas Screen, Stourbridge, England; British Castors Limited, 03, West Bromwich, England

[22] Filed: June 17, 1974

[21] Appl. No.: 480,130

[52] U.S. Cl. .................................................. 16/47
[51] Int. Cl. ........................ A47f 91/00; B60f 33/00
[58] Field of Search .......................... 16/45, 46–47, 16/107, 98, 18 R, 18 A, DIG. 35

[56] References Cited
UNITED STATES PATENTS

| | | | |
|---|---|---|---|
| 1,432,966 | 10/1922 | Chesnatt | 16/45 |
| 3,648,325 | 3/1972 | Stewart et al. | 16/46 |
| 3,713,186 | 1/1973 | Cartwright | 16/45 |
| 3,757,383 | 9/1973 | Iiyoshi | 16/45 |
| 3,805,320 | 4/1974 | Hensel et al. | 16/18 |
| 3,822,437 | 7/1974 | Screen | 16/45 |

*Primary Examiner*—Geo. V. Larkin
*Attorney, Agent, or Firm*—Friedman & Goodman

[57] ABSTRACT

A twin-wheeled castor has a body which covers upper parts of the wheels and which is connected with an attachment member for pivoting relative thereto about an axis which is upright in use. The wheels are rotatably mounted on a first portion of the body which is disposed between the wheels. The bearing which provides the connection between the attachment member andd the body is disposed in a second portion of the body which lies outside the peripheries of the wheels.

3 Claims, 4 Drawing Figures

PATENTED JUL 15 1975 3,894,310
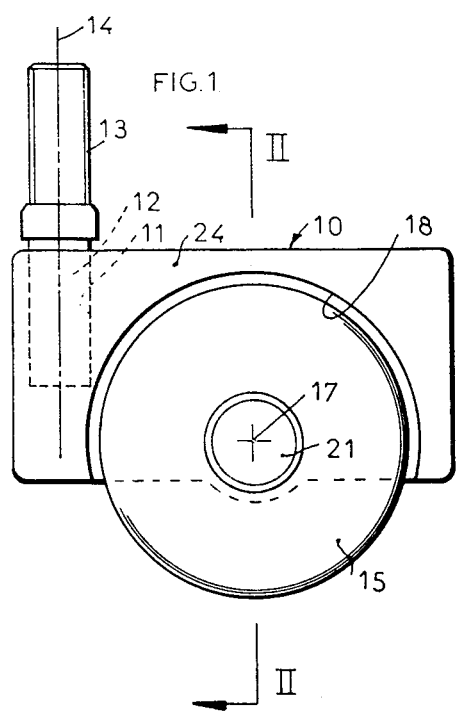
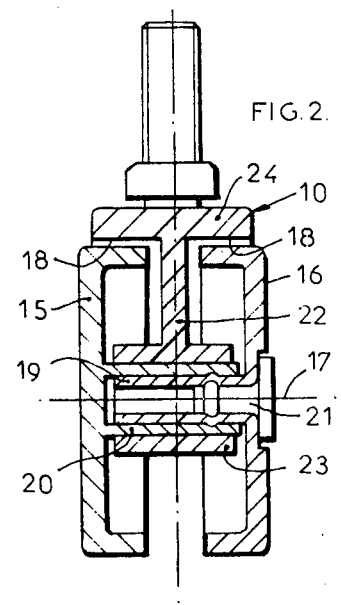
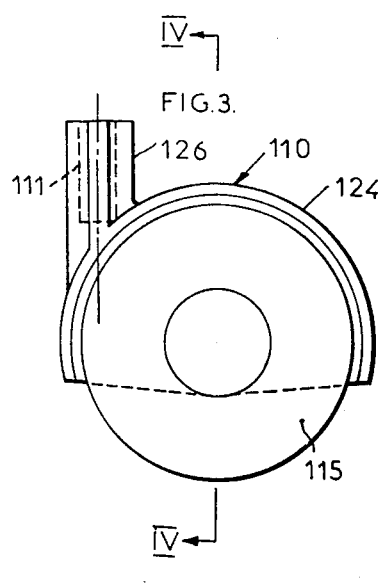
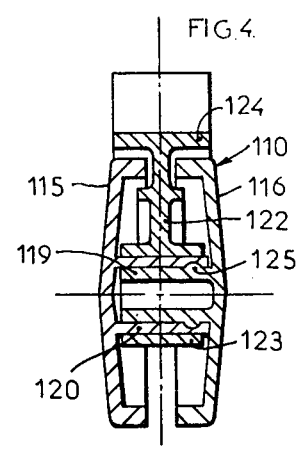

3,894,310

TWIN-WHEELED CASTOR

CROSS-REFERENCE TO RELATED APPLICATION

This application is a continuation-in-Part of my prior application Ser. No. 308,937, now Pat. No. 3,822,437.

BACKGROUND TO THE INVENTION

This invention relates to a castor of the kind having an attachment member for mounting the castor on an article of furniture or the like, a body mounted on the attachment member for pivoting movement relative thereto about a swivelling axis which is generally upright when the castor is in use, and a pair of ground-engaging rollers mounted on the body for rotation relative thereto about a rolling axis transverse to and off-set from the swivelling axis.

There has been proposed a castor of the kind referred to wherein the body includes a first portion which is disposed between the rollers and a second portion which covers upper parts of the peripheral surfaces of the rollers, the rollers being mounted on said first portion of the body and a bearing for the attachment member also being formed in said first portion of the body. This construction suffers from the disadvantage that the requirements of adequate strength and esthetically pleasing appearance are in direct conflict. In order to ensure adequate strength, the first portion of the body, which portion contains the bearing for the attachment member must be wide and accordingly the rollers must be spaced widely apart. A castor with widely spaced rollers is not esthetically pleasing.

There is a further disadvantage associated with widely spaced rollers. If, when a two-wheeled castor is travelling along a floor surface, one of the wheels engages a small protuberance on the floor surface, a torque will be applied to the castor, tending to swivel the body on the attachment member. If such swivelling occurs, the castor will tend to travel in a new direction. The torque applied to the castor about the swivelling axis depends upon the distance of point of contact between the roller and protuberance from the swivelling axis and the greater the distance of the rollers from the swivelling axis, the greater is the risk that the castor will be swivelled into a new direction of travel.

It is an object of the present invention to overcome the foregoing disadvantage.

According to the invention, the attachment member is mounted in a second portion of the body which lies outside the peripheries of the rollers. With this construction, the first portion of the body which lies between the rollers functions only to mount the rollers and accordingly can be relatively narrow, whilst having adequate strength to perform this single function. Thus, the rollers can be placed relatively closely together.

BRIEF DESCRIPTION OF THE DRAWINGS

FIG. 1 shows a castor in accordance with the invention in side elevation,

FIG. 2 shows the castor of FIG. 1 in cross-section on the line II — II of FIG. 1, FIG. 3 shows a second example of castor in accordance with the invention in side elevation, and FIG. 4 shows the castor of FIG. 3 in cross-section on the line IV — IV of FIG. 3.

DETAILED DESCRIPTION

The castor illustrated in FIGS. 1 and 2 has a body 10, the general overall shape of which approximates to that of a rectangular prism. Adjacent to one end of the body 10 there is formed a vertical bore 11 which extends downwardly into the body from the upper surface thereof. Within the bore is received a lower end portion of an attachment in the form of a spindle 12 which is adapted, for example by the formation of a screw thread 13 on an upper end portion, to be attached to a leg of an article of furniture. The spindle is retained in the bore 11 by means such as a circlip (not shown) which engages in mutually-opposed grooves formed in the spindle and in the wall of the bore 11 respectively.

The body 10 presents within the bore 11 a cylindrical bearing surface for co-pending with the spindle 12 to provide for relative pivoting about a swivelling axis 14 which is normally vertical when the castor is in use.

The castor further includes two rollers 15 and 16 which are mounted on the body 10 for rotation relative thereto about a horizontal rolling axis 17 which is off-set from the swivelling axis 14 in a direction lengthwise of the body 10. The body is formed at each of its side faces with a part-cylindrical recess 18 centered on the rolling axis 17 and each of the rollers 15 and 16 is partly disposed within a respective one of the recesses 18. The rollers include integral hollow spigots 19 and 20 which fit one within the other, either with sufficient clearance to permit of relative rotation of the rollers about the rolling axis 17, or with an interference fit so that relative rotation of the rollers is prevented. The spigots 19 and 20 are retained in assembled relation with one another by a plug 21, a shank of which is secured within the spigot 19 and a head of which overlies the axially-outwardly presented face of the roller 16.

The rollers 15 and 16 are mounted in a portion 22 of the body 10 which separates the recesses 18 from each other and which therefore lies between the rollers 15 and 16. This portion of the body includes a hollow cylindrical spigot 23 which is centered on the rolling axis 17 and which is of sufficient internal diameter to receive the spigot 20 with sufficient clearance for the spigot 20 to be freely rotatable within the spigot 23. The rollers 15 and 16 are thus mounted in the portion 22 of the body.

A further portion 24 of the body 10 is disposed radially outwardly of the peripheries of the rollers 15 and 16 and radially outwardly of the recesses 18. This portion 24 covers upper parts of the peripheral surfaces of the rollers 15 and 16 and is integrally connected with the portion 22 of the body at a first position in front of the rollers and below the level of the rolling axis 17 and also at a second position to the rear of the rollers and also below the rolling axis 17.

It will be noted that the bore 11 is formed in the portion 24 of the body and that the bore is off-set horizontally from the rolling axis 17 by a distance such that, even if produced, the bore would not intersect with the peripheries of the rollers. It will be appreciated that with this arrangement the bore 11 does not weaken the portion 22 of the body in which the rollers are mounted. Accordingly, the portion 22 will have adequate strength even if it is thin and the rollers 15 and 16 can be positioned relatively close to each other.

Referring now to the castor shown in FIGS. 3 and 4, certain parts thereof correspond to parts already described with reference to FIGS. 1 and 2. Such corresponding parts are indicated in FIGS. 3 and 4 by like reference numerals with the prefix 1 and the preceding description is deemed to apply except for the differences hereinafter mentioned.

The upper surface of the body 110 of the castor which in FIGS. 3 and 4 is curved to follow the curve of the peripheral faces of the rollers 115 and 116. The rollers are mounted on a first portion 122 of the body, this first portion including a hollow spigot 123 and lying between the rollers.

The rollers 115 and 116 are secured together by means of the spigots 119 and 120, the inner spigot 119 being formed with a circumferential rib 125 which is received in a corresponding annular recess formed in the spigot 120. The spigot 119 is a snap-fit within the spigot 120. The spigot 120 is a sliding fit within the spigot 123 of the body so that the rollers 115 and 116 can rotate together to the body.

The spigot 119 may be sliding fit within the spigot 120 so that the rollers 115 and 116 can rotate relative to each other. In this case, the rib 125 is sufficiently large to ensure that the spigots are retained in assembled relation with one another throughout the working life of the castor, notwithstanding that some wear of the rib 125 will occur. Alternatively, the spigots 119 and 120 may be secured rigidly to each other, for example by means of an adhesive.

The body 110 further includes a cover portion 124 from which there projects upwardly a boss 126. The boss is formed with a vertical bore 111 in which an attachment member in the form of a spindle is rotatably received. The cover portion 124 of the body covers an upper part of the peripheral surface of each of the rollers 115 and 116 and is integrally connected with the portion 122 of the body over an arc greater than 180 degrees. Thus, the cover portion is integrally connected with the portion 122 at a first position in front of the rollers and below the level of the rolling axis 117 and at a second position behind the rollers and below the level of the rolling axis.

It will be noted that the bore 111 does not extend into the portion 122 of the body. This portion of the body can therefore be narrow and yet have adequate strength properly to support the rollers 115 and 116. Accordingly, the rollers can be positioned close to each other.

I claim:

1. A castor comprising an attachment member for mounting the castor on an article of furniture or the like, a body mounted on the attachment member for pivoting movement relative thereto about a swivelling axis which is generally upright in use and two rollers having respective peripheral surfaces and being mounted on the body for rotation relative thereto about a rolling axis transverse to the swivelling axis, wherein the rollers are mounted on a first portion of the body which lies between the rollers, the attachment member is mounted in a second portion of the body which lies outside the peripheries of the rollers and the second portion of the body covers an upper part of the peripheral surfaces of the rollers.

2. A castor according to claim 1 wherein said second part of the body surrounds more than one half of the peripheral surface of each roller and is connected with the first portion of the body at two positions below the level of a rolling axis about which the rollers rotate relative to the body.

3. A castor according to claim 1 wherein the attachment member is received in a bore formed in the second portion of the body and the swivelling axis is off-set from the rolling axis by a distance such that said bore even if produced, would not intersect with the peripheries of the rollers.

* * * * *